(12) United States Patent
Vizzini et al.

(10) Patent No.: US 7,473,664 B2
(45) Date of Patent: Jan. 6, 2009

(54) FORMATION OF ZIEGLER-NATTA CATALYST

(75) Inventors: Kayo Vizzini, Pasadena, TX (US); David Knoeppel, League City, TX (US); Steven Gray, Bellaire, TX (US); David Rauscher, Agleton, TX (US); Tim Coffy, Houston, TX (US); Henry Enriquez, Pearland, TX (US)

(73) Assignee: Fina Technology, Inc., Houston, TX (US)

( * ) Notice: Subject to any disclaimer, the term of this patent is extended or adjusted under 35 U.S.C. 154(b) by 232 days.

(21) Appl. No.: 11/474,145

(22) Filed: Jun. 23, 2006

(65) Prior Publication Data

US 2007/0299224 A1 Dec. 27, 2007

(51) Int. Cl.
*B01J 37/22* (2006.01)

(52) U.S. Cl. .......... 502/133; 502/103; 502/104; 502/125; 526/124.2; 526/107; 526/348

(58) Field of Classification Search ............ 526/124.2, 526/107, 348; 502/103, 104, 133, 125
See application file for complete search history.

(56) References Cited

U.S. PATENT DOCUMENTS

| 6,174,971 B1 * | 1/2001 | Chen et al. ............. 526/125.3 |
| 6,734,134 B1 * | 5/2004 | Gray et al. ............. 502/132 |
| 2005/0209094 A1 | 9/2005 | Knoeppel |

\* cited by examiner

*Primary Examiner*—Ling-Siu Choi
(74) *Attorney, Agent, or Firm*—Tenley R. Krueger

(57) ABSTRACT

Methods of forming polyolefins and catalysts are described herein. Such methods generally include forming Ziegler-Natta catalyst compounds in the absence of one or more blended compounds typically used to form such catalyst.

60 Claims, No Drawings

US 7,473,664 B2

FORMATION OF ZIEGLER-NATTA CATALYST

FIELD

Embodiments of the present invention generally relate to methods of forming Ziegler-Natta type catalyst compositions.

BACKGROUND

Many processes for forming Ziegler-Natta catalyst systems utilize blends of components. Unfortunately, such blends generally are specialty chemicals having a high production cost.

Therefore, it is desirable to develop processes for forming Ziegler-Natta catalysts capable of producing polymers having similar properties to polymers produced from catalysts formed from blends, while reducing the production cost.

SUMMARY

Embodiments of the present invention include processes of forming catalyst systems. The process generally include contacting an alkyl magnesium compound with an alcohol to form a magnesium dialkoxide compound and contacting the magnesium dialkoxide compound with a plurality of first agents to form reaction product "A", wherein the plurality of first agents include a first compound and a second compound. The process further includes contacting reaction product "A" with a second agent to form reaction product "B", wherein the second agent includes a transition metal and a halogen, contacting reaction product "B" with a third agent to form reaction product "C", wherein the third agent includes a first metal halide and optionally contacting reaction product "C" with a fourth agent to form reaction product "D", wherein the fourth agent includes a second metal halide. The process further includes contacting reaction product "D" with fifth agent to form a Ziegler-Natta catalyst component, wherein the fifth agent includes an organoaluminum compound.

Embodiments of the invention further include methods of forming polyolefins using the catalysts described herein. Such methods generally include providing a magnesium dialkoxide compound, contacting the magnesium dialkoxide compound with a plurality of first agents to form a reaction product, wherein the plurality of first agents include a metal halide and a compound represented by the formula $A(O_xR^4)_y$, wherein A is selected from titanium, silicon, aluminum, carbon, tin and germanium, $R^4$ is selected from $C_1$ to $C_{10}$ alkyls, x is 0 or 1 and y is the valence of A, contacting the reaction product with agents selected from halogenating agents/titanating agents, activating agents and combinations thereof to form a catalyst and contacting the catalyst with an olefin monomer to form a polyolefin.

Embodiments of the present invention include processes of forming catalyst systems. The process generally include contacting an alkyl magnesium compound with an alcohol to form a magnesium dialkoxide compound and contacting the magnesium dialkoxide compound with a first agent to form reaction product "A", wherein the first agent include a halogenating/titanating agent. The process further includes contacting reaction product "A" with a plurality of second agents to form reaction product "B", wherein the plurality of second agents include a third compound and a fourth compound, contacting reaction product "B" with a third agent to form reaction product "C", wherein the third agent includes a first metal halide and optionally contacting reaction product "C" with a fourth agent to form reaction product "D", wherein the fourth agent includes a second metal halide. The process further includes contacting reaction product "D" with fifth agent to form a Ziegler-Natta catalyst component, wherein the fifth agent includes an organoaluminum compound.

Embodiments of the present invention include processes of forming catalyst systems. The process generally include contacting a magnesium metal with an alcohol to form a magnesium containing compound and contacting the magnesium containing compound with a first agent to form reaction product "A", wherein the first agent includes a first halogenating/titanating agent. The process further includes contacting reaction product "A" with a second agent to form reaction product "B", wherein the second agent includes a second halogenating/titanating agent, contacting reaction product "B" with a third agent to form reaction product "C", wherein the third agent includes a first metal halide and optionally contacting reaction product "C" with a fourth agent to form reaction product "D", wherein the fourth agent includes a second metal halide. The process further includes contacting reaction product "D" with fifth agent to form a Ziegler-Natta catalyst component, wherein the fifth agent includes an organoaluminum compound.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "polymer density" is measured via ASTM-D-1238.

As used herein, "meltflow index" is measured via ASTM-D-1238-E.

As used herein, "melt index ratio" is measured via ASTM-D-1238-F.

The term "equivalent" refers to a molar ratio of a component to a starting material. As used herein, the starting material is either the alkyl magnesium compound or the magnesium metal, in some embodiments.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

Catalyst Systems

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^4_x;$$

wherein M is a transition metal, $R^4$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^4$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide, or silica, for example.

Prior efforts to form the Ziegler-Natta catalyst generally included the methods described below. (See, U.S. Pat. No. 6,734,134 and U.S. Pat. No. 6,174,971, which are incorporated by reference herein.)

A representative, non-limiting, illustration of a possible reaction scheme may be illustrated as follows:

$$MgR^1R^2 + 2R^3OH \rightarrow Mg(OR^3)_2 \quad \quad 1)$$

$$Mg(OR^3)_2 + ClA(O_xR^4)_y \rightarrow \text{"A"} \quad \quad 2)$$

$$\text{"A"} + TiCl_4/Ti(OR^5)_4 \rightarrow \text{"B"} \quad \quad 3)$$

$$\text{"B"} + TiCl_4 \rightarrow \text{"C"} \quad \quad 4)$$

$$\text{"C"} + TiCl_4 \rightarrow \text{"D"} \quad \quad 5)$$

$$\text{"D"} + AR^6_3 \rightarrow \text{Catalyst} \quad \quad 6)$$

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention. For example, the third and fourth agents may be added to reaction product B at the same time to form reaction product D.

Such methods generally include contacting an alkyl magnesium compound with an alcohol to form a magnesium dialkoxide compound. Such reaction may occur at a reaction temperature ranging from room temperature to about 90° C. for a time of up to about 10 hours, for example.

The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example.

The method then includes contacting the magnesium dialkoxide compound with a first agent to form reaction product "A".

Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

$$ClA(O_xR^4)_y;$$

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide $ClTi(O^iPr)_3$ and $ClSi(Me)_3$, for example.

The method then includes contacting reaction product "A" with a second agent to form reaction product "B".

Such reaction may occur in the presence of an inert solvent. The inert solvents may include any of those solvents previously discussed herein, for example.

The reaction may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

$$TiCl_4/Ti(OR^5)_4;$$

wherein $R^5$ is selected from $C_2$ to $C_{20}$ alkyl groups. Non-limiting illustrations of second agents include blends of titanium chloride and titanium alkoxides, such as $TiCl_4/Ti(OBu)_4$. The blends may have an equivalent of $TiCl_4:Ti(OR^5)_4$ of from about 0.5 to about 6 or from about 2 to about 3, for example.

The method may then include contacting reaction product "B" with a third agent to form reaction product "C".

Such reaction may occur in the presence of an inert solvent. The inert solvents may include any of those solvents previously discussed herein, for example.

The reaction may further occur at room temperature, for example.

Non-limiting illustrations of third agents include metal halides. The metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 2.5, for example.

The method may further include contacting reaction product "C" with a fourth agent to form reaction product "D".

Such reaction may occur in the presence of an inert solvent. The inert solvents may include any of those solvents previously discussed herein, for example.

The reaction may further occur at room temperature, for example.

The fourth agent may be added to the reaction product "C" in an equivalent of from about 0.1 to about 5, or from about 0.25 to about 4 or from about 0.45 to about 2.0, for example.

Non-limiting illustrations of fourth agents include metal halides. The metal halides may include any metal halide previously described herein.

The method may then include contacting reaction product "D" with a fifth agent to form the catalyst component.

The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^6_3;$$

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), n-octyl aluminum and n-hexyl aluminum, for example.

As illustrated above, the first agent and the second agent generally include blends of compounds. Unfortunately, such blends are specialty chemicals having a high production cost.

Therefore, one or more embodiments of the invention (either alone or in combination) generally include modifying/removing the blended agents to reduce the production cost, while retaining one or more of the beneficial properties obtained via blends.

In one embodiment, it is contemplated that the first agent includes a plurality of first agents (i.e., not a blend.) The plurality of first agents generally includes at least a first compound and a second compound. In one embodiment, the first compound and the second compound are added to the magnesium dialkoxide compound at approximately the same time. In another embodiment, the first compound is added to the magnesium dialkoxide compound prior to contact with the second compound. In yet another embodiment, the second compound is added to the magnesium dialkoxide compound prior to contact with the first compound.

The second compound may be added in an equivalent of from about 0.1 to about 0.5 or about 0.25, for example, while the first compound may be added in an amount of 1 minus the equivalent of the second compound, for example. In one specific, non-limiting embodiment, the second compound is added in an equivalent of 0.25 and the first compound is added in an equivalent of 0.75, for example.

The second compound may include a metal halide, for example. The metal halides may include any metal halide known to one skilled in the art, such as titanium tetrachloride ($TiCl_4$), for example.

The second compound may include a compound having the formula $A(O_xR^4)_y$, such as $Ti(O^iPr)_4$, for example.

Alternatively, or in addition, one or more embodiments of the invention generally include modifying and/or removing the blended second agent.

In such an embodiment, it is contemplated that the second agent includes a plurality of second agents (i.e., not a blend.) The plurality of second agents generally includes at least a third compound and a fourth compound. In one embodiment, the third compound and the fourth compound are added to the reaction product "A" at approximately the same time. In another embodiment, the third compound is added to the reaction product "A" prior to contact with the fourth compound. In yet another embodiment, the fourth compound is added to the reaction product "A" prior to contact with the third compound.

The third compound may be added in an equivalent of from about 0.1 to about 3, or from about 0.5 to about 2 or from about 0.75 to about 1.25, for example. The fourth compound may be added in an equivalent of from about 1.5 to about 3.5 or from about 1.75 to about 2.25, for example.

The third and fourth compounds may contact reaction product "A" at a reaction temperature of from about room temperature to about 60° C., for example. In one embodiment, the reaction temperature is about 45° C., for example.

The third compound may include a compound represented by the formula $Ti(OR^5)_4$, wherein $R^5$ is selected from alkyl groups, such as butyl, for example.

The fourth compound may include a metal halide, such as titanium tetrachloride, for example.

Further, many of the alkyl magnesium compounds utilized to form Ziegler-Natta catalysts, and in particular, butylethyl magnesium, are high cost materials. Therefore, one or more embodiments may include modifying and/or replacing the alkyl magnesium compound. For example, one specific embodiment includes utilizing a magnesium metal for the catalyst preparation in place of the alkyl magnesium compound.

In such an embodiment, the magnesium metal may contact the alcohol (e.g., to form the magnesium dialkoxide) at a temperature of from about room temperature to about 200° C., for example. In one embodiment, the magnesium metal contacts the alcohol at a plurality of temperatures, such as a first temperature of from about room temperature to about 120° C. and a second temperature of from about 100° C. to about 200° C., for example.

The magnesium metal may be added to the alcohol in an equivalent of from about 0.05 to about 10, or from about 0.05 to about 2, or from about 0.10 to about 0.90 or from about 2 to about 10 or from about 2 to about 5, for example. In one embodiment, an excess amount of the alcohol contacts the magnesium metal.

The resulting mixture (e.g., magnesium dialkoxide) may be washed in the presence of a modifier. The modifier may include an organoaluminum compound, such as triethyl aluminum or mixtures of butyl ethyl magnesium and triethyl aluminum, for example.

Upon formation, the catalyst may optionally be subjected to heat treating. Such heat treating generally includes heating the catalyst to a temperature in the range of from about 40° C. to about 150° C., or from about 90° C. to about 125° C. or from about 40° C. to about 60° C., for example. Such heat treatment may occur for a time of from about 0.5 hours to about 24 hours or from about 1 hour to about 4 hours, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously (in series, parallel or combinations thereof) in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

In one embodiment, ethylene based polymers may have a density of from about 0.86 g/cc to about 0.978 g/cc, or from about 0.88 g/cc to about 0.965 g/cc, or from about 0.90 g/cc to about 0.96 g/cc or from about 0.91 g/cc to about 0.94 g/cc, for example.

Such ethylene based polymers may have a molecular weight distribution of at least 4 or at least 5, for example.

The ethylene based polymers may have a melt strength of from about 6.5 cN to about 11 cN, or from about 7 cN to about 11 cN or from about 7 cN to about 10 cN, for example.

The ethylene polymers may have a melt flow index (MFI) of from about 0.01 dg/min to about 1000 dg/min., or from about 0.01 dg/min. to about 100 dg/min., or from about 0.02 dg/min. to about 50 dg/min. or from about 0.03 dg/min. to about 0.1 dg/min, for example.

The ethylene based polymers may have a melt index ratio I21 of at least about 20, or at least about 30, at least about 40, at least about 50 or at least about 55, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

Examples (Replacement of First Agent)

In the following examples, samples of Ziegler-Natta catalyst compounds were prepared in a 500 mL reactor equipped with four Morten's indentions and a dropping funnel, three-blade agitator and septa.

As used herein, "BEM" refers to 20.2 wt. % solution of butylethylmagnesium (0.12 wt. % Al).

As used herein, "EHOH" refers to 2-ethylhexanol.

As used herein, "TNBT" refers to tetra n-butyl titanate.

As used herein, "TEAl" refers to triethyl aluminum.

Comparative Catalyst A: The preparation of Catalyst A was achieved by slurrying 100 mmol (54.7 g) of BEM in hexane (total volume 100 ml) and stirring (250 rpm) the mixture at room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (45 g) of $ClTi(O^iPr)_3$ (2M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT were added to a 250 mL graduated cylinder. 200 mmol (37.04 g) of $TiCl_4$ was then added dropwise to the TNBT mixture at room temperature over 30 minutes to form $2TiCl_4/Ti(OBu)_4$. Hexane was then added to the mixture to provide a mixture volume of 250 mL. The resulting mixture was then allowed to set over 2 hours.

The preparation then included adding the $2TiCl_4/Ti(OBu)_4$ dropwise to the reaction mixture "A" at room temperature over 2 hours to form reaction mixture "B". The reaction mixture "B" was then stirred at room temperature for another hour. The reaction mixture "B" was then decanted and the resulting solids were washed three times with 200 mL of hexane. The solids were then suspended in 200 mL of hexane.

The preparation then included adding 100 mmol (19.0 g) of $TiCl_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of $TiCl_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 12 g.

Catalyst B: The preparation of Catalyst B was achieved by slurrying 100 mmol (54.7 g) of BEM in hexane (total volume 100 ml) and stirring (250 rpm) the mixture room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 75 mmol (20.68 g) of Ti(O$^i$Pr)$_4$ to the mixture at room temperature dropwise over 30 minutes. The reaction mixture was then stirred at room temperature for 45 minutes.

The preparation then included adding 25 mmol (4.7 g) of TiCl$_4$ (diluted to 30 mL with hexane) to the mixture at room temperature dropwise over 40 minutes. A clear, solid free solution (reaction mixture "A") was obtained. The reaction mixture "A" was then stirred at room temperature for another 2 hours In addition, 100 mmol (34.4 g) of TNBT were added to a 250 mL graduated cylinder. 200 mmol (37.04 g) of TiCl$_4$ was then added dropwise to the TNBT mixture at room temperature over 30 minutes. Hexane was then added to the mixture to provide a mixture volume of 250 mL. The resulting mixture was then allowed to set over 2 hours.

The preparation then included adding the 2TiCl$_4$/Ti(OBu)$_4$ dropwise to the reaction mixture "A" at room temperature over 2 hours to form reaction mixture "B". The reaction mixture "B" was then stirred at room temperature for another hour. The reaction mixture "B" was then decanted and the solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of 12 g.

The resulting catalysts were then exposed to polymerization (at 80° C., 125 psig, 0.25 mmol/L TEAl cocatalyst, 1 h) with ethylene monomer to form polyethylene. The results of such polymerizations follow in Table 1.

TABLE 1

| Run No. | Catalyst | $D_{50}$ | $D_{50}$ (catalyst) | Bulk Density | MI$_2$ | HLMI | SR$_2$ | SR$_5$ |
|---|---|---|---|---|---|---|---|---|
| 1 | B | 4.75 | 4.75 | 0.37 | 0.39 | 0.39 | 0.37 | 10.3 |
| 2 | A | 4.60 | 4.60 | — | — | — | — | — |

*$D_{50}$ is average particle size in microns, activity is expressed in g/g/h, bulk density in g/cc, MI$_2$ in dg/min., HLMI in dg/min., SR$_2$ is HLMI/MI$_2$ and SR$_5$ is HLMI/MI$_5$ The polymers produced by the embodiments described herein (e.g., catalyst A) resulted in a substantially equivalent particle size distribution and activity to catalysts prepared by previous costly methods (e.g., catalyst A.)

Examples (Replacement of Second Agent)

In the following examples, samples of Ziegler-Natta catalyst compounds were prepared in a 500 mL reactor equipped with Morten's indentions and a dropping funnel, three-blade agitator and septa.

As used herein, "BEM" refers to 20.2 wt. % solution of butylethylmagnesium (0.12 wt. % Al).

As used herein, "EHOH" refers to 2-ethylhexanol.

As used herein, "TNBT" refers to tetra n-butyl titanate.

As used herein, "TEAl" refers to triethyl aluminum.

Comparative Catalyst A: The preparation of Catalyst A was achieved by slurrying 100 mmol (54.7 g) of BEM in hexane (total volume 100 ml) and stirring (250 rpm) the mixture at room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (77.5 g) of ClTi(O$^i$Pr)$_3$ (1M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT and 150 mL of hexane were added to a 500 mL graduated cylinder. 200 mmol (37.04 g) of TiCl$_4$ was then added dropwise to the TNBT mixture at room temperature over 10 minutes to form 2TiCl$_4$/Ti(OBu)$_4$. Hexane was then added to the mixture to provide a mixture volume of 300 mL. The resulting mixture was then allowed to set over 2 hours.

The preparation then included adding the 2TiCl$_4$/Ti(OBu)$_4$ dropwise to the reaction mixture "A" at room temperature over 2 hours to form reaction mixture "B". The reaction mixture "B" was then stirred at room temperature for another hour. The reaction mixture "B" was then decanted and the resulting solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 14 g.

Catalyst B: The preparation of Catalyst B was achieved by slurrying 100 mmol (54.7 g) of BEM in hexane (total volume 100 ml) and stirring at room temperature at 250 rpm. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (45 g) of ClTi(O$^i$Pr)$_3$ (2M in hexane) to the mixture at room temperature over 30 minutes. A clear, solid free solution (reaction mixture "A") was obtained. The reaction mixture "A" was then stirred at room temperature for another hour.

The preparation then included adding 100 mmol (34.04 g) of TNBT (diluted to 100 mL in hexane) dropwise to the reaction mixture "A" at room temperature over 5 minutes. The reaction mixture "A" was then stirred for 45 minutes. 200 mmol (37.94 g) of TiCl$_4$ (diluted to 200 mL with hexane) was then added to the reaction mixture at room temperature over 2 hours to form reaction mixture "B" and mixed at 250 rpm. The reaction mixture "B" was then stirred at room temperature at 400 rpm for another hour. The reaction mixture "B" was then decanted and the resulting white solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 14.1 g.

Catalyst C: The preparation of Catalyst C was achieved by slurrying 100 mmol (54.7 g) of BEM in hexane (total volume 100 ml) and stirring at room temperature at 250 rpm. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included dropwise adding 75 mmol (20.68 g) of Ti(O$^i$Pr)$_3$ (diluted to 50 mL with hexane) to the mixture at room temperature over 5 minutes. The reaction mixture was then stirred at room temperature for another 10 minutes.

The preparation then included dropwise adding 25 mmol (4.7 g) of TiCl$_4$ (diluted to 50 mL with hexane) to the mixture at room temperature over 30 minutes. A clear, solid free solution (reaction mixture "A") was obtained. The reaction mixture "A" was then stirred at room temperature for another hour.

The preparation then included adding 100 mmol (34.04 g) of TNBT (diluted to 50 mL in hexane) dropwise to the reaction mixture "A" at 45° C. over 5 minutes. The resulting mixture was then stirred for 30 minutes. 200 mmol (37.94 g) of TiCl$_4$ (diluted to 150 mL with hexane) was then added to the reaction mixture at 45° C. over 2 hours to form reaction mixture "B" (at a mixing speed of 250 rpm). The reaction mixture "B" was then stirred at room temperature at 400 rpm for another hour. The reaction mixture "B" was then decanted and the solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 19.0 g.

Catalyst D: The preparation of Catalyst D was achieved by slurrying 100 mmol (54.7 g) of BEM in hexane (total volume 100 ml) and stirring at room temperature at 250 rpm. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 75 mmol (20.68 g) of Ti(O$^i$Pr)$_3$ (diluted to 50 ml) to the mixture at room temperature dropwise over 5 minutes. The reaction mixture was then stirred at room temperature for 10 minutes.

The preparation then included adding 25 mmol (4.7 g) of TiCl$_4$ (diluted to 50 mL with hexane) to the mixture at room temperature dropwise over 30 minutes. A clear, solid free solution (reaction mixture "A") was obtained. The reaction mixture "A" was then stirred at room temperature for another 1 hour at 400 rpm.

The preparation then included adding 200 mmol (68.1 g) of TNBT(diluted to 100 ml with hexane) dropwise to the reaction mixture "A" at 45° C. over 5 minutes. The mixture was stirred for one hour. 200 mmol (37.94 g) of TiCl$_4$ (diluted to 150 ml with hexane) was then added to the reaction mixture at 45° C. over 2 hours to form reaction mixture "B". During this precipitation step, the agitation speed was increased to 400 rpm. The reaction mixture "B" was then stirred at 45° C. at 400 rpm for another hour. The reaction mixture "B" was then decanted and the solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 6.5 g.

Catalyst E: The preparation of Catalyst E was achieved by slurrying 100 mmol (54.7 g) of BEM in hexane (total volume 100 ml) and stirring at room temperature at 250 rpm. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 75 mmol (20.68 g) of Ti(O$^i$Pr)$_3$ (diluted to 50 ml) to the mixture at room temperature dropwise over 5 minutes. The reaction mixture was then stirred at room temperature for 10 minutes.

The preparation then included adding 25 mmol (4.7 g) of TiCl$_4$ (diluted to 50 mL with hexane) to the mixture at room temperature dropwise over 30 minutes. A clear, solid free solution (reaction mixture "A") was obtained. The reaction mixture "A" was then stirred at room temperature for another 1 hour at 400 rpm.

The preparation then included adding 50 mmol (17.02 g) of TNBT (diluted to 100 ml with hexane) dropwise to the reaction mixture "A" at room temperature over 5 minutes. The resulting mixture was stirred for one hour. 200 mmol (37.94 g) of TiCl$_4$ (diluted to 150 ml with hexane) was then added to the reaction mixture at room temperature over 2 hours to form reaction mixture "B". During this precipitation step, the agitation speed was increased to 400 rpm. The reaction mixture "B" was then stirred at room temperature at 400 rpm for another hour. The reaction mixture "B" was then decanted and the solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition. The catalyst composition was then stirred at room temperature for another hour. The catalyst composition was then decanted and dried, resulting in a yield of about 18.0 g.

Catalyst F.: The preparation of Catalyst F was achieved by slurrying 100 mmol (54.7 g) of BEM in hexane (total volume 100 ml) and stirring (250 rpm) the mixture (see description in 0001) at room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (77.5 g) of ClTi(O$^i$Pr)$_3$ (1M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT and 100 ml of hexane were added to a 300 mL graduated cylinder. 100 mmol (19.0 g) of TiCl$_4$ was then added dropwise to the TNBT mixture at room temperature over 10 minutes to form TiCl$_4$/Ti(OBu)$_4$. Hexane was then added to the mixture to provide a mixture volume of 180 mL. The resulting mixture was then allowed to set over 4 hours.

The preparation then included adding the TiCl$_4$/Ti(OBu)$_4$ dropwise to the reaction mixture "A" at room temperature over 2 hours to form reaction mixture "B". The preparation then included adding 100 mmol (19.0 g) of TiCl$_4$ (diluted to 50 mL in hexane) dropwise to the reaction mixture "B" at room temperature over one hour to form reaction mixture "C". The reaction mixture "C" was then stirred at room temperature for another hour. The reaction mixture "C" was then decanted and the resulting solids were washed three times with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) dropwise to the reaction mixture "D" at room temperature over 20 minutes to form reaction mixture "E". The reaction mixture "E" was then stirred at room temperature for another hour. The reaction mixture "E" was then decanted and the solids were washed three times with 200 mL of hexane. The solids were then suspended in 150 ml of hexane.

The preparation then included adding 16 mmol (7.39 g) of TEAl (25 wt. %) to the reaction mixture "E" at room temperature over 25 minutes to form the catalyst composition. The catalyst composition was then stirred at room temperature for another hour. The catalyst composition was then decanted and dried, resulting in a yield of about 14 g.

The resulting catalysts were then exposed to polymerization (at 80° C., 125 psig, 0.25 mmol/L TIBAl cocatalyst, H$_2$/C$_2$=0.25, hexane diluent, 1 h Polymerization time) with ethylene monomer to form polyethylene. The results of such polymerizations follow in Table 1.

TABLE 1

| Run No. | Catalyst | Catalyst $D_{50}$ (μ) | Polymer $D_{50}$ (μ) | Activity (g/g/h) | Bulk Density (g/cc) | $MI_2$ (dg/min) | $MI_5$ (dg/min) | $SR_5$ | $SR_2$ | Density (g/cc) |
|---|---|---|---|---|---|---|---|---|---|---|
| 1 | B | 22.7 | 614.4 | 25,500 | 0.27 | 0.67 | 2.2 | 10.0 | 32.4 | 0.9597 |
| 2 | A | 8.3 | 236.1 | 20,000 | 0.38 | 0.62 | 1.84 | 10.5 | 31.3 | 0.9591 |
| 3 | C | 8.9 | 338.8 | 31,400 | 0.34 | 0.8 | 2.39 | 10.1 | 30.1 | 0.9600 |
| 4 | D | 48.8 | 605.3 | 29,600 | 0.30 | 0.53 | 1.55 | 10.3 | 30.0 | 0.9572 |
| 5 | E | 6.2 | 329.0 | 32,700 | 0.30 | 0.65 | 2.06 | 9.0 | 28.6 | 0.9582 |
| 6 | F | 16.3 | 467.7 | 34,000 | 0.29 | 0.26 | 0.83 | 9.3 | 29.6 | 0.9575 |

It was observed that the particle size distribution was affected by both the temperature and the amount of TNBT when the TiCl$_4$/TNBT blend was added as separate compounds. For example, at room temperature, a larger particle size was observed in comparison to that produced by catalyst A. Increasing the temperature during precipitation generally resulted in a smaller particle size. In addition, decreasing the amount of TNBT generally produced polymers having a smaller particles size.

Examples (Replacement of BEM)

In the following examples, samples of Ziegler-Natta catalyst compounds were prepared and exposed to polymerization.

As used herein, "BEM" refers to 20.6 wt. % solution of butylethylmagnesium (0.11 wt. % Al).

As used herein, "EHOH" refers to 2-ethylhexanol.

As used herein, "TNBT" refers to tetra n-butyl titanate.

As used herein, "TEAl" refers to triethyl aluminum.

Comparative Catalyst A: The preparation of Catalyst A was achieved by slurrying 100 mmol (53.6 g) of BEM in hexane (total volume 200 ml) and stirring (250 rpm) the mixture at room temperature (in a 1 L Buchi reactor.) In addition, 206 mmol (26.9 g) of EHOH was slurried in 50 mL of hexane and the resulting solution was added dropwise to the BEM solution at room temperature over 20 minutes. The reaction mixture was then stirred at room temperature for another hour.

The preparation then included adding 100 mmol (77.5 g) of ClTi(O$^i$Pr)$_3$ (1M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT and 150 mL of hexane were added to a 500 mL graduated cylinder. 200 mmol (37.04 g) of TiCl$_4$ was then added dropwise to the TNBT mixture at room temperature over 10 minutes to form 2TiCl$_4$/Ti(OBu). Hexane was then added to the mixture to provide a mixture volume of 300 mL. The resulting mixture was then allowed to set over 2 hours.

The preparation then included adding the 2TiCl$_4$/Ti(OBu)$_4$ dropwise to the reaction mixture "A" at room temperature over 2 hours to form reaction mixture "B". The reaction mixture "B" was then stirred at room temperature for another hour. The reaction mixture "B" was then decanted and the resulting solids were washed three times with 200 mL of hexane. The solids were then suspended in 200 mL of hexane.

The preparation then included adding 200 mmol (37.9 g) of TiCl$_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed three times with 200 mL of hexane. The solids were then suspended in 150 mL of hexane.

The preparation then included adding 16 mmol (7.39 g) of TEAl (25 wt. %) to the reaction mixture "C" at room temperature over 25 minutes to form the catalyst composition. The catalyst composition was then stirred at room temperature for another hour. The catalyst composition was then decanted and dried, resulting in a yield of about 14 g.

Catalyst B: The preparation of Catalyst B was achieved by mixing 82 mmol (2 g) of magnesium chips with 10 equivalents 820 mmol (107.2 g) of EHOH and stirring the resulting mixture at initial temperature of 100° C. and slowly increasing the mixing temperature to 180° C. The mixture was stirred until no hydrogen gas evolution was observed. Unreacted magnesium was then filtered and the resulting magnesium alkoxide was dried under vacuum, resulting in a yield of 22.0 g (94.5%.) The resulting precipitate was then dissolved in hexane and 0.1 mmol of TEAl.

The resulting magnesium alkoxide (5 g, 17.7 mmol) was transferred to a 500 mL Schlenk flask and mixed with hexane (100 mL) and 25% TEAl in hexane (0.75 g, 1.63 mmol). The resulting mixture was stirred at 35° C. for three hours.

The preparation then included adding 17.7 mmol (13.72 g) of ClTi(O$^i$Pr)$_3$ to the mixture to form reaction mixture "A". The reaction mixture "A" was then stirred at room temperature for another hour and kept under argon for two days.

In addition, 17.7 mmol (6.0 g) of TNBT (in 60 mL of hexane) was added to a 100 mL graduated cylinder. 35.4 mmol (6.72 g) of TiCl$_4$ was then added dropwise to the TNBT mixture and stirred to form 2TiCl$_4$/Ti(OBu)$_4$.

The preparation then included adding the 2TiCl$_4$/Ti(OBu)$_4$ dropwise to the reaction mixture "A" at room temperature over 1 hour to form reaction mixture "B". The reaction mixture "B" was then stirred at room temperature for another hour. The reaction mixture "B" was then allowed to settle. The resulting supernatant was decanted and the solids were washed three times with 100 mL of hexane. The solids were then reslurried in 100 mL of hexane.

The preparation then included adding 35.4 mmol (6.8 g) of TiCl$_4$ dropwise to the reaction mixture "B" at room temperature to form reaction mixture "C". The reaction mixture "C" was then stirred at room temperature for another hour and allowed to settle. The reaction mixture "C" was then decanted and the solids were washed four times with 100 mL of hexane. The solids were then reslurried in 100 mL of hexane.

The preparation then included adding 2.7 mmol (1.24 g) of TEAl (25 wt. %) to the reaction mixture "C" at room temperature to form the catalyst composition. The catalyst composition was then stirred at room temperature for another hour and allowed to settle. The catalyst composition was then decanted and the solids were reslurried with 80 mL of hexane.

The resulting catalysts were then exposed to polymerization (at 80° C., 125 psig, 0.25 mmol/L TEAl cocatalyst, $H_2/C_2=0.25$, 1 h poly.) with ethylene monomer to form polyethylene. The results of such polymerizations follow in Table 1.

TABLE 1

| Run No. | Catalyst | $D_{50}$ (microns) | Activity (g/g/h) | Bulk Density (g/cc) | MI2 (dg/min) | MI5 (dg/min) | SR5 | SR2 | Density (g/cc) |
| --- | --- | --- | --- | --- | --- | --- | --- | --- | --- |
| 1 | B | 12.3 | 30,000 | 0.22 | 1.27 | 3.82 | 10.6 | 31.8 | 0.9605 |
| 2 | A | 16.0 | 31,600 | 0.28 | 1.31 | 4.13 | 10.7 | 33.8 | 0.9606 |

While the foregoing is directed to embodiments of the present invention, other and further embodiments of the invention may be devised without departing from the basic scope thereof and the scope thereof is determined by the claims that follow.

What is claimed is:

1. A process of forming a catalyst system comprising:
   contacting an alkyl magnesium compound with an alcohol to form a magnesium dialkoxide compound;
   contacting the magnesium dialkoxide compound with a first compound and a second compound to form reaction product "A", wherein the second compound comprises a metal halide and the first compound is represented by the formula $A(O_xR^4)_y$, wherein A is selected from titanium, silicon, aluminum, carbon, tin and germanium, $R^4$ is selected from $C_1$ to $C_{10}$ alkyls, x is 0 or 1 and y is the valence of A;
   contacting reaction product "A" with a second agent to form reaction product "B", wherein the second agent comprises a transition metal and a halogen;
   contacting reaction product "B" with a third agent to form reaction product "C", wherein the third agent comprises a first metal halide;
   optionally contacting reaction product "C" with a fourth agent to form reaction product "D", wherein the fourth agent comprises a second metal halide; and
   contacting reaction product "D" with fifth agent to form a Ziegler-Natta catalyst component, wherein the fifth agent comprises an organoaluminum compound.

2. The process of claim 1, wherein the alkyl magnesium compound is represented by the formula $MgR^1R^2$, wherein $R^1$ and $R^2$ are independently selected from $C_1$ to $C_{10}$ alkyls.

3. The process of claim 1, wherein the alkyl magnesium compound is selected from butyl ethyl magnesium, diethyl magnesium, dipropyl magnesium, dibutyl magnesium and combinations thereof.

4. The process of claim 1, wherein the alcohol contacts the alkyl magnesium compound in an equivalent of from about 0.5 to about 6.

5. The process of claim 1, wherein the alcohol is represented by the formula $R^3OH$, wherein $R^3$ is selected from $C_2$ to $C_{20}$ alkyls.

6. The process of claim 1, wherein the alcohol is selected from butanol, isobutanol, 2-ethylhexanol and combinations thereof.

7. The process of claim 1, wherein the second agent comprises a blend.

8. The process of claim 7, wherein the blend comprises a metal halide and a metal alkoxide.

9. The process of claim 7, wherein the blend comprises $TiCl_4/Ti(OBu)_4$.

10. The process of claim 1, wherein the second agent comprises a plurality of second agents.

11. The process of claim 1, wherein the second agent contacts reaction product "A" in an equivalent of from about 0.5 to about 5.

12. The process of claim 1, wherein the third agent comprises $TiCl_4$.

13. The process of claim 1, wherein the third agent contacts reaction product "B" in an equivalent of from about 0.1 to about 5.

14. The process of claim 1, wherein the fourth agent comprises $TiCl_4$.

15. The process of claim 1, wherein the fourth agent contacts reaction product "C" in an equivalent of from about 0 to about 5.

16. The process of claim 1, wherein the fifth agent comprises an aluminum alkyl.

17. The process of claim 1, wherein the fifth agent is selected from trimethyl aluminum, triisobutyl aluminum, triethyl aluminum and combinations thereof.

18. The process of claim 1, wherein the fifth agent contacts reaction product "D" in an equivalent of from about 0.1 to about 2.

19. The process of claim 1, wherein the second compound comprises $TiCl_4$ and the first compound comprises titanium isopropoxide.

20. The process of claim 19, wherein the first compound contacts the magnesium dialkoxide in an equivalent of 1 minus the equivalent of the second compound and the second compound contacts the magnesium dialkoxide in an equivalent of from about 0.1 to about 0.5.

21. The process of claim 1, wherein the first compound contacts the magnesium dialkoxide compound prior to the second compound contacting the magnesium dialkoxide compound.

22. A process of forming a catalyst system comprising:
   contacting an alkyl magnesium compound with an alcohol to form a magnesium dialkoxide compound;
   contacting the magnesium dialkoxide compound with a first agent to form reaction product "A", wherein the first agent comprises a halogenating/titanating agent;
   contacting reaction product "A" with a a third compound and a fourth compound, wherein the third compound comprises $Ti(OBu)_4$ and the fourth compound comprises $TiCl_4$;
   contacting reaction product "B" with a third agent to form reaction product "C", wherein the third agent comprises a first metal halide;
   optionally contacting reaction product "C" with a fourth agent to form reaction product "D", wherein the fourth agent comprises a second metal halide; and
   contacting reaction product "D" with fifth agent to form a Ziegler-Natta catalyst component, wherein the fifth agent comprises an organoaluminum compound.

23. The process of claim 22, wherein the alkyl magnesium compound is represented by the formula $MgR^1R^2$, wherein $R^1$ and $R^2$ are independently selected from $C_1$ to $C_{10}$ alkyls.

24. The process of claim 22, wherein the alkyl magnesium compound is selected from butyl ethyl magnesium, diethyl magnesium, dipropyl magnesium, dibutyl magnesium and combinations thereof.

25. The process of claim 22, wherein the alcohol contacts the alkyl magnesium compound in an equivalent of from about 0.5 to about 6.

26. The process of claim 22, wherein the alcohol is represented by the formula $R^3OH$, wherein $R^3$ is selected from $C_2$ to $C_{20}$ alkyls.

27. The process of claim 22, wherein the alcohol is selected from butanol, isobutanol, 2-ethylhexanol and combinations thereof.

28. The process of claim 22, wherein the first agent is represented by the formula $ClA(O_xR^4)_y$, wherein A is selected from titanium, silicon, aluminum, carbon, titanium and germanium, $R^4$ is selected from $C_1$ to $C_{10}$ alkyls, x is 0 or 1 and y is the valence of A minus 1.

29. The process of claim 22, wherein the third agent comprises $TiCl_4$.

30. The process of claim 22, wherein the third agent contacts reaction product "B" in an equivalent of from about 0.1 to about 5.

31. The process of claim 22, wherein the fourth agent comprises $TiCl_4$.

32. The process of claim 22, wherein the fourth agent contacts reaction product "C" in an equivalent of from about 0 to about 5.

33. The process of claim 22, wherein the fifth agent comprises an aluminum alkyl.

34. The process of claim 22, wherein the fifth agent is selected from trimethyl aluminum, triisobutyl aluminum, triethyl aluminum and combinations thereof.

35. The process of claim 22, wherein the fifth agent contacts reaction product "D" in an equivalent of from about 0.1 to about 2.

36. The process of claim 22, wherein the third compound contacts reaction product "A" in an equivalent of from about 0.1 to about 3.0 and the fourth compound contacts reaction product "A" in an equivalent of from about 0.5 to about 4.0.

37. The process of claim 22, wherein the third compound contacts reaction product "A" in an equivalent of from about 0.25 to about 1.25, and the fourth compound contacts reaction product "A" in an equivalent of from about 1.75 to about 2.25.

38. The process of claim 22, wherein the third compound contacts reaction product "A" in an amount less than an amount of the fourth compound.

39. The process of claim 22, wherein the plurality of second agents contact reaction product "A" at a reaction temperature of from about room temperature to about 60° C.

40. A process of forming a catalyst system comprising:
contacting a magnesium metal with an alcohol to form a magnesium containing compound;
contacting the magnesium containing compound with a first agent to form reaction product "A", wherein the first agent comprises a first halogenating/titanating agent;
contacting reaction product "A" with a second agent to form reaction product "B", wherein the second agent comprises a second halogenating/titanating agent;
contacting reaction product "B" with a third agent to form reaction product "C", wherein the third agent comprises a first metal halide;
optionally contacting reaction product "C" with a fourth agent to form reaction product "D", wherein the fourth agent comprises a second metal halide; and
contacting reaction product "D" with fifth agent to form a Ziegler-Natta catalyst component, wherein the fifth agent comprises an organoaluminum compound.

41. The process of claim 40, wherein the alcohol contacts the magnesium metal in an equivalent of from about 0.05 to about 2.

42. The process of claim 40, wherein the magnesium metal contacts the alcohol in an equivalent of from about 0.1 to about 0.9.

43. The process of claim 40, wherein the alcohol contacts the magnesium metal in excess.

44. The process of claim 43, further comprising contacting the magnesium containing compound with a modifier.

45. The process of claim 43, further comprising contacting the magnesium containing compound with a modifier selected from triethyl aluminum, butyl ethyl magnesium and combinations thereof.

46. The process of claim 40, wherein the alcohol contacts the magnesium metal at a temperature of from about room temperature to about 200° C.

47. The process of claim 40, wherein the alcohol contacts the magnesium metal at a first temperature of from about room temperature to about 120° C. and a second temperature of from about 100° C. to about 200° C., wherein the second temperature is greater than the first temperature.

48. The process of claim 40, wherein the alcohol is represented by the formula $R^3OH$, wherein $R^3$ is selected from $C_2$ to $C_{20}$ alkyls.

49. The process of claim 40, wherein the alcohol is selected from butanol, isobutanol, 2-ethylhexanol and combinations thereof.

50. The process of claim 40, wherein the second agent comprises a blend.

51. The process of claim 50, wherein the blend comprises $TiCl_4/Ti(OBu)_4$.

52. The process of claim 40, wherein the second agent contacts reaction product "A" in an equivalent of from about 0.5 to about 5.

53. The process of claim 40, wherein the third agent comprises $TiCl_4$.

54. The process of claim 40, wherein the third agent contacts reaction product "B" in an equivalent of from about 0.1 to about 5.

55. The process of claim 40, wherein the fourth agent comprises $TiCl_4$.

56. The process of claim 40, wherein the fourth agent contacts reaction product "C" in an equivalent of from about 0 to about 5.

57. The process of claim 40, wherein the fifth agent comprises an aluminum alkyl.

58. The process of claim 40, wherein the fifth agent is selected from trimethyl aluminum, triisobutyl aluminum, triethyl aluminum and combinations thereof.

59. The process of claim 40, wherein the fifth agent contacts reaction product "D" in an equivalent of from about 0.1 to about 2.

60. The process of claim 40, wherein the first agent is represented by the formula $ClA(O_xR^4)_y$, wherein A is selected from titanium, silicon, aluminum, carbon, titanium and germanium, $R^4$ is selected from $C_1$ to $C_{10}$ alkyls, x is 0 or 1 and y is the valence of A minus 1.

* * * * *